United States Patent
Kubo et al.

(10) Patent No.: US 10,505,194 B2
(45) Date of Patent: Dec. 10, 2019

(54) POSITIVE ELECTRODE FOR LITHIUM-ION SECONDARY BATTERY AND LITHIUM-ION SECONDARY BATTERY

(71) Applicants: SUMITOMO RUBBER INDUSTRIES, LTD., Kobe-shi, Hyogo (JP); NATIONAL INSTITUTE OF ADVANCED INDUSTRIAL SCIENCE AND TECHNOLOGY, Tokyo (JP)

(72) Inventors: Tatsuya Kubo, Kobe (JP); Akihiro Yamano, Ikeda (JP); Naoto Yamashita, Ikeda (JP); Toshikatsu Kojima, Ikeda (JP); Masahiro Yanagida, Ikeda (JP)

(73) Assignees: SUMITOMO RUBBER INDUSTRIES, LTD., Kobe-Shi, Hyogo (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 0 days.

(21) Appl. No.: 16/289,418

(22) Filed: Feb. 28, 2019

(65) Prior Publication Data

US 2019/0198877 A1 Jun. 27, 2019

Related U.S. Application Data

(63) Continuation of application No. 15/299,000, filed on Oct. 20, 2016.

(30) Foreign Application Priority Data

Nov. 19, 2015 (JP) ................................. 2015-226719
Sep. 27, 2016 (JP) ................................. 2016-188137

(51) Int. Cl.
*H01M 4/00* (2006.01)
*H01M 4/62* (2006.01)
*H01M 4/134* (2010.01)
*H01M 4/36* (2006.01)
*H01M 4/38* (2006.01)
*H01M 10/0525* (2010.01)
*H01M 4/1393* (2010.01)
*H01M 4/60* (2006.01)
*H01M 4/02* (2006.01)

(52) U.S. Cl.
CPC .......... *H01M 4/622* (2013.01); *H01M 4/134* (2013.01); *H01M 4/1393* (2013.01); *H01M 4/366* (2013.01); *H01M 4/38* (2013.01); *H01M 4/382* (2013.01); *H01M 4/608* (2013.01); *H01M 4/625* (2013.01); *H01M 10/0525* (2013.01); *H01M 2004/028* (2013.01)

(58) Field of Classification Search
CPC ........ H01M 4/134; H01M 4/366; H01M 4/38; H01M 4/622; H01M 4/608; H01M 10/0525; H01M 2004/028
See application file for complete search history.

(56) References Cited

U.S. PATENT DOCUMENTS

| | | |
|---|---|---|
| 2013/0029222 A1 | 1/2013 | Niwa et al. |
| 2013/0108802 A1 | 5/2013 | Oladeji |
| 2013/0122358 A1 | 5/2013 | Maeda et al. |
| 2014/0255794 A1* | 9/2014 | Zhang ................... H01M 4/364 429/337 |
| 2016/0293955 A1 | 10/2016 | Hochi et al. |

FOREIGN PATENT DOCUMENTS

| | | |
|---|---|---|
| CN | 102664264 A | 9/2012 |
| EP | 3 054 504 A1 | 10/2016 |
| JP | 2012-150933 A | 8/2012 |
| JP | 2015-92449 A | 5/2015 |
| WO | WO 2011/129103 A1 | 10/2011 |
| WO | WO 2015/050086 A1 | 4/2015 |

OTHER PUBLICATIONS

Chinese Office Action and Search Report, dated Dec. 28, 2018, for Chinese Application No. 201610959031.9, along with an English translation.
Extended European Search Report issued in corresponding European Patent Application No. 16196113.1, dated Dec. 13, 2016.
Office Action dated Nov. 2, 2017, in Korean Patent Application No. 10-2016-0145602, with English translation.

* cited by examiner

*Primary Examiner* — Cynthia H Kelly
*Assistant Examiner* — Monique M Wills
(74) *Attorney, Agent, or Firm* — Birch, Stewart, Kolasch & Birch, LLP

(57) ABSTRACT

An object of the present invention is to provide a novel positive electrode which is produced using a rubber being an inexpensive material and is capable of enhancing a charge and discharge capacity and cyclability of a lithium-ion secondary battery, and the lithium-ion secondary battery composed of the positive electrode. In the lithium-ion secondary battery, the positive electrode comprises a current collector and an electrode layer formed on a surface of the current collector, the electrode layer comprises an active material, an electrically-conductive additive and a thermosetting resin binder subjected to thermosetting, and the active material comprises a sulfur-based positive-electrode active material prepared by heat-treating a starting material comprising a rubber and sulfur under a non-oxidizing atmosphere.

9 Claims, 2 Drawing Sheets

POSITIVE ELECTRODE FOR LITHIUM-ION SECONDARY BATTERY AND LITHIUM-ION SECONDARY BATTERY

This application is a Continuation of copending application Ser. No. 15/299,000, filed on Oct. 20, 2016, which claims priority under 35 U.S.C. § 119(a) to Application No. 2015-226719, filed in Japan on Nov. 19, 2015, and Application No. 2016-188137, filed in Japan on Sep. 27, 2016, all of which are hereby expressly incorporated by reference into the present application.

TECHNICAL FIELD

The present invention relates to a positive electrode for a lithium-ion secondary battery, and a lithium-ion secondary battery made using the positive electrode.

BACKGROUND OF THE INVENTION

Since a lithium-ion secondary battery, one type of non-aqueous electrolyte secondary batteries, is light in weight and has a large charging and discharging capacity, it has been used mainly as a battery for portable electronic devices. Moreover, practical use of lithium-ion secondary batteries as batteries for motor vehicles such as electric automobiles is expected. Generally, materials comprising a rare metal such as cobalt or nickel are used as a positive-electrode active material of a lithium-ion secondary battery. However, due to the fact that rare metals are small in the distributed amount, not always easily available and additionally expensive, a positive-electrode active material using a material that replaces a rare metal has been required.

A technique of using elemental sulfur as a positive-electrode active material is known. Namely, sulfur is easily available compared to rare metals and is inexpensive, and has a further advantage that a charging and discharging capacity of a lithium-ion secondary battery can be made larger than the present state. For example, it is known that a lithium-ion secondary battery using sulfur as a positive-electrode active material can achieve about 6 times larger charging and discharging capacity than a lithium-ion secondary battery using lithium cobalt oxide which is a general positive-electrode material.

However, the lithium-ion secondary battery using elemental sulfur as the positive-electrode active material has a problem that a battery capacity is deteriorated through repeated charging and discharging. That is, elemental sulfur likely generates a compound with lithium when discharging and since the generated compound is soluble into a non-aqueous electrolyte (for example, ethylene carbonate and dimethyl carbonate and the like) of the lithium-ion secondary battery, the charging and discharging capacity is gradually reduced through repeated charging and discharging due to the sulfur eluting into the electrolyte.

There is a technique of using polyacrylonitrile as a starting material for a sulfur-based positive-electrode active material. However, polyacrylonitrile is a relatively expensive material. Further, in a lithium-ion secondary battery using this positive-electrode active material for a positive electrode, battery performances such as a charging and discharging capacity and cyclability greatly depend on a quality (particularly a particle size) of a staring polyacrylonitrile powder. Polyacrylonitrile having good quality is further expensive. Therefore, it is difficult to provide an inexpensive lithium-ion secondary battery having a large charging and discharging capacity and excellent cyclability.

It is known that in order to improve cyclability by preventing sulfur from eluting into an electrolyte, a sulfur-based positive-electrode active material prepared by heat-treating sulfur together with a diene rubber is to be mixed with a fluorine-containing resin as a binder and the mixture is used as a positive-electrode material (WO 2015/050086). However, sufficient cyclability has not yet been obtained.

SUMMARY OF THE INVENTION

In the lithium-ion secondary battery using the positive-electrode material prepared by mixing the sulfur-based positive-electrode active material with the fluorine-containing resin as a binder, when charging and discharging are repeated, cyclability is lowered, which was considered to arise from peeling or desorption of the active material from a current collector due to expansion of the active material or cutting of a conducting path formed from an electrically-conductive additive. An object of the present invention is to provide a positive electrode for a lithium-ion secondary battery, which does not have such a disadvantage as mentioned above and exhibits an excellent charging and discharging capacity and cyclability, and a lithium-ion secondary battery using the positive electrode.

The present inventors have made intensive studies to solve the above-mentioned problem and as a result, have found that a sulfur-based positive-electrode active material obtained by heat-treating a rubber and sulfur wherein the heat treatment is performed using a thermosetting resin as a binder and allowing the resin to be cured provides a positive electrode for a lithium-ion secondary battery exhibiting excellent properties. The present inventors have made further studies and have completed the present invention.

Namely, the present invention relates to:
[1] a positive electrode for a lithium-ion secondary battery comprising a current collector and an electrode layer formed on a surface of the current collector,
wherein the electrode layer comprises an active material, an electrically-conductive additive and a thermosetting resin binder subjected to thermosetting, and
the active material comprises a sulfur-based positive-electrode active material prepared by heat-treating a starting material comprising a rubber and sulfur under a non-oxidizing atmosphere,
[2] the positive electrode for a lithium-ion secondary battery according to the above [1], wherein the thermosetting resin binder comprises at least one of a polyimide resin and a polyamide-imide resin,
[3] the positive electrode for a lithium-ion secondary battery according to the above [1] or [2], wherein compounding ratios of the active material, the electrically-conductive additive and the thermosetting resin binder in the electrode layer are 30 to 95% by mass, 2 to 40% by mass and 3 to 30% by mass, respectively based on the total compounding amount of the three components,
[4] the positive electrode for a lithium-ion secondary battery according to any one of the above [1] to [3], wherein a heat-treating temperature when preparing the sulfur-based positive-electrode active material is from 250 C.° to 550° C.,
[5] the positive electrode for a lithium-ion secondary battery according to any one of the above [1] to [4], wherein the starting material of the sulfur-based positive-electrode active material further comprises a vulcanization accelerator,
[6] the positive electrode for a lithium-ion secondary battery according to any one of the above [1] to [5], wherein the starting material of the sulfur-based positive-electrode active material further comprises an electrically-conductive carbon material,

[7] the positive electrode for a lithium-ion secondary battery according to the above [6], wherein the electrically-conductive carbon material is a carbon material having a graphite structure,

[8] the positive electrode for a lithium-ion secondary battery according to the above [6] or [7], wherein the starting material of the sulfur-based positive-electrode active material comprises 250 to 1500 parts by mass of the sulfur, 3 to 250 parts by mass of the vulcanization accelerator and 5 to 50 parts by mass of the electrically-conductive carbon material based on 100 parts by mass of the rubber,

[9] the positive electrode for a lithium-ion secondary battery according to any one of the above [1] to [8], wherein a total content of the sulfur in the sulfur-based positive-electrode active material is not less than 50% by mass, and

[10] a lithium-ion secondary battery comprising the positive electrode for a lithium-ion secondary battery according to any one of the above [1] to [9].

According to the present invention, it is possible to provide a novel positive electrode which is produced using a rubber being an inexpensive material and is capable of enhancing a charging and discharging capacity and cyclability of a lithium-ion secondary battery, and the lithium ion secondary battery made using the positive electrode.

DETAILED DESCRIPTION

Figure 1:
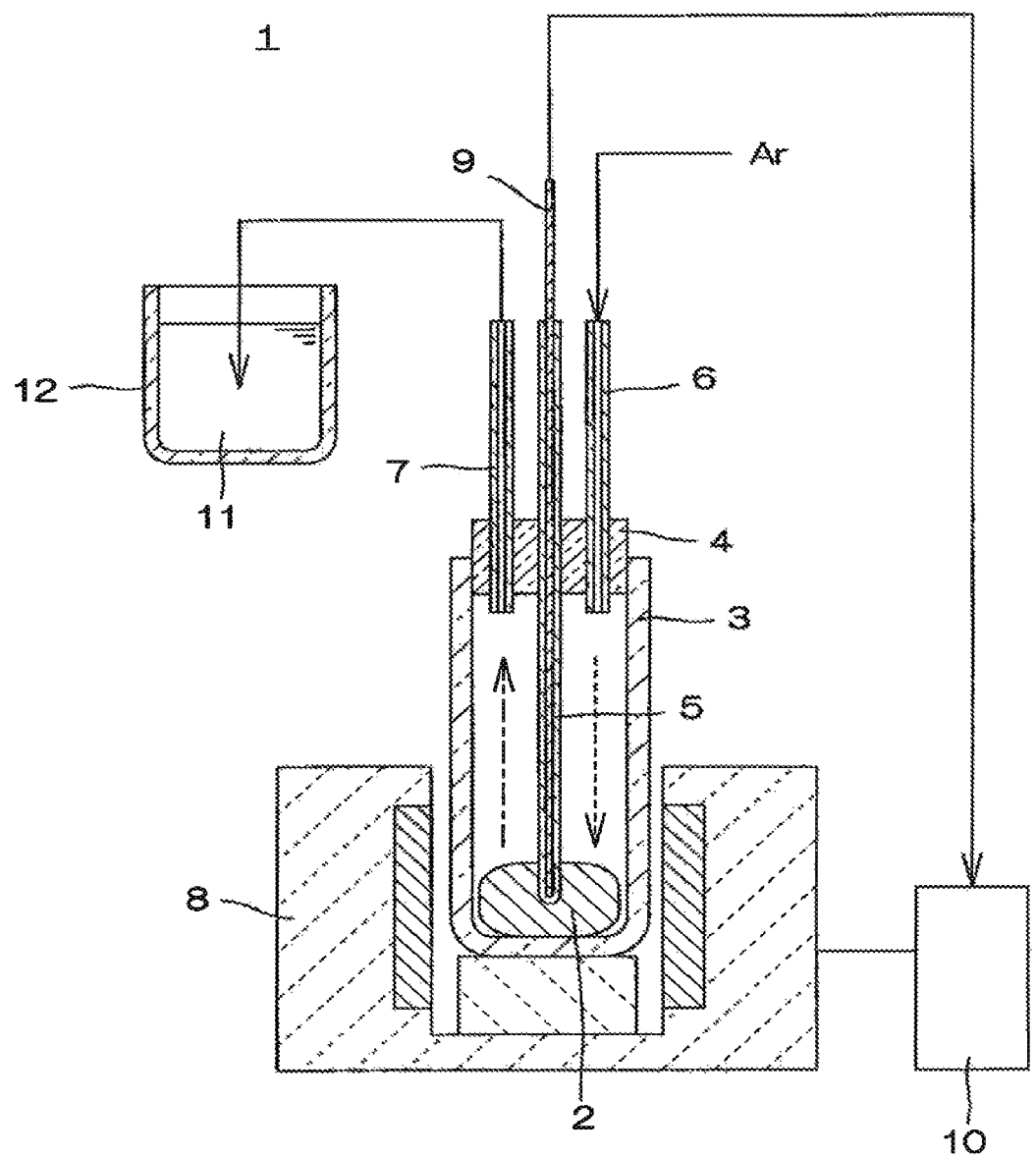
FIG. 1 is a sectional view schematically illustrating a reaction apparatus used for production of a sulfur-based positive-electrode active material in Examples.

The positive electrode for the lithium-ion secondary battery and the lithium ion secondary battery according to embodiments of the present invention are explained below in detail.

<Positive Electrode for Lithium-Ion Secondary Battery>

The positive electrode for the lithium-ion secondary battery comprises a current collector and an electrode layer formed on a surface of the current collector.

[Current Collector]

Current collectors generally used for a positive electrode for a lithium-ion secondary battery can be used. Examples of such current collectors include an aluminum foil, an aluminum mesh, a punched aluminum sheet, an aluminum expanded sheet, a stainless steel foil, a stainless steel mesh, a punched stainless steel sheet, a stainless steel expanded sheet, a foamed nickel, a non-woven nickel fabric, a copper foil, a copper mesh, a punched copper sheet, a copper expanded sheet, a titanium foil, a titanium mesh, a non-woven carbon fabric, and the like.

Particularly current collectors made of a non-woven carbon fabric and/or a woven carbon fabric of a carbon having a high degree of graphitization are suitable as a current collector for a sulfur-based positive-electrode active material since no hydrogen is contained and reactivity with sulfur is low. Examples of a starting material for a carbon fiber having a high degree of graphitization include various pitches (namely, by-products of petroleum, coal, coal tar, and the like), a polyacrylonitrile fiber (PAN), and the like which are a material for a carbon fiber.

[Electrode Layer]

The electrode layer is one formed on a surface of the current collector by heat-treating a mixture for the electrode layer comprising an active material, an electrically-conductive additive and a thermosetting resin binder under a non-oxidizing atmosphere at a temperature being higher than the curing temperature of the thermosetting resin binder.

(Active Material)

The active material comprises a sulfur-based positive-electrode active material prepared by heat-treating a starting material comprising a rubber and sulfur under a non-oxidizing atmosphere. The active material is preferably one comprising a sulfur-based positive-electrode active material.

It is presumed that the sulfur-based positive-electrode active material has a thienoacene structure in a form of a long chain polymer formed by condensation and linking of thiophene rings and represented by the following formula (i).

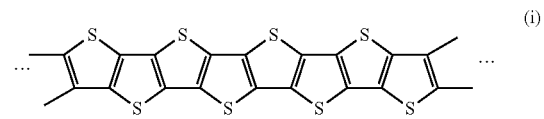

Namely, as a result of Raman spectrum analysis of the sulfur-based positive-electrode active material with the laser Raman microscope RAMAN-11 available from Nanophoton Corporation under the conditions of an excitation wavelength λ=532 nm, a grating of 600 gr/mm, and a resolution of 2 cm$^{-1}$, peaks are observed at around 500 cm$^{-1}$, 1250 cm$^{-1}$, and 1450 cm$^{-1}$ of Raman shift. While these spectra differ from spectra called D band around 1350 cm$^{-1}$ and G band around 1590 cm$^{-1}$ which are seen in a graphite structure of 6-membered ring, when comparing these spectra with thienoacene spectra described in the document (Chem. Phys. Chem., 2009, 10, 3069-3076), it is considered that the peak around 500 cm$^{-1}$ is derived from in-plane deformation of thiophene, the peak around 1250 cm$^{-1}$ is derived from C-C in-plane deformation of a thienyl ring and the peak around 1450 cm$^{-1}$ is derived from C-C stretching of thiophene.

It is considered that the sulfur-based positive-electrode active material preferably complies with the following characteristics. Namely, in FT-IR spectrum (measured by a diffused reflection method under the conditions of a resolution: 4 cm$^{-1}$, the number of accumulations: 100 times and a measuring range: 400 to 4000 cm$^{-1}$ using a Fourier transform infrared spectrophotometer IR Affinity-1 available from Shimadzu Corporation), it is preferable that the peaks are present at around 917 cm$^{-1}$, around 1042 cm$^{-1}$, around 1149 cm$^{-1}$, around 1214 cm$^{-1}$, around 1388 cm$^{-1}$, around 1415 cm$^{-1}$ and around 1439 cm$^{-1}$.

<<Rubber>>

Examples of the rubber include diene rubbers such as a natural rubber, an isoprene rubber and a butadiene rubber. The rubbers can be used alone or in combination of two or more thereof. Among these, a natural rubber and a high cis polybutadiene rubber are preferred particularly. The both rubbers are apt to have an irregular structure having a bent molecular chain and an intermolecular force between the adjacent molecular chains can be relatively small, thereby hardly causing crystallization. Therefore, flexibility and processability of not only the structure body of the formula (i) but also the sulfur-based positive-electrode active material can be enhanced.

It can be considered that use of particularly a butadiene rubber such as a high cis polybutadiene rubber is preferable for more homogenizing the structure of the thienoacene body. Here, the high cis polybutadiene rubber is a polybutadiene rubber having not less than 95% by mass of cis-1,4 bond content. The sulfur-based positive-electrode active material formed from such a high cis polybutadiene rubber is characterized in that in the Raman spectrum, there is a peak around 1940 $cm^{-1}$ of the Raman shift too, and peaks around 1400 $cm^{-1}$ and around 1550 $cm^{-1}$ are very small, unlike sulfur-based positive-electrode active materials derived from natural rubbers.

Sulfur-based positive-electrode active materials derived from natural rubbers can be considered to include a graphite structure in a part of the thienoacene structure, and therefore, a part of the structure can be considered to be inhomogeneous. Meanwhile, it can be considered that the sulfur-based positive-electrode active material derived from a butadiene rubber does not include such a graphite structure, and a structure thereof is considered to be homogeneous, and therefore, the above-mentioned effect is especially excellent.

In an embodiment, the rubber is provided in an un-vulcanized state as a starting material for the sulfur-based positive-electrode active material.

<<Sulfur>>

Sulfur in various forms such as powdery sulfur, precipitated sulfur, insoluble sulfur, colloidal sulfur and the like may be used. From the viewpoint of uniform dispersion of sulfur into the rubber, colloidal sulfur of fine particles is used suitably.

The compounding ratio of sulfur is preferably not less than 250 parts by mass, more preferably not less than 300 parts by mass based on 100 parts by mass of the rubber. On the other hand, while there is no upper limit of the compounding ratio of sulfur, the compounding ratio is usually not more than 1500 parts by mass, preferably not more than 1000 parts by mass. Since the compounding ratio is within the above-mentioned range, there is a tendency that a charging and discharging capacity and cyclability can be increased fully. Even if the ratio exceeds 1500 parts by mass, it is difficult to improve a charging and discharging capacity or cyclability sufficiently, and there is a tendency that the ratio of not more than 1500 parts by mass is advantageous from the viewpoint of cost.

<<Vulcanization Accelerator>>

It is preferable that the starting material for the sulfur-based positive-electrode active material further comprises a vulcanization accelerator. This is because the vulcanization accelerator can function for enhancing cyclability of a lithium-ion secondary battery.

Examples of the vulcanization accelerator include one or more of thiourea-, guanidine-, thiazole-, sulfenamide-, thiuram-, dithiocarbamate- and xanthogenate-based vulcanization accelerators. Among these, examples of thiuram compounds include one or more of tetramethylthiuram disulfide (TT), tetraethylthiuram disulfide (TET), tetrabutylthiuram disulfide (TBT), tetrakis(2-ethylhexyl)thiuram disulfide (TOT-N), tetramethylthiuram monosulfide (TS), dipentamethylenethiuram tetrasulfide (TRA), and the like.

Particularly preferred as the thiuram compound are TT, TET, TBT, TS, and the like, in which any of terminal substituent groups is a linear chain alkyl. Preferred dithiocarbamate compounds are zinc salts thereof. Examples of a zinc salt of a dithiocarbamic acid include one or more of zinc diethyldithiocarbamate (EZ), zinc dibutyldithiocarbamate (BZ), zinc dimethyldithiocarbamate (PZ), zinc N-ethyl-N-phenyldithiocarbamate (PX), and the like.

When these compounds are selected and used as a vulcanization accelerator, the sulfur-based positive-electrode active material being excellent in exhibiting an effect of enhancing not only a charging and discharging capacity but also cyclability can be formed.

When the vulcanization accelerator is compounded, the compounding ratio thereof is preferably not less than 3 parts by mass, more preferably not less than 10 parts by mass based on 100 parts by mass of the rubber. On the other hand, the compounding ratio is preferably not more than 250 parts by mass, more preferably not more than 50 parts by mass. When the compounding ratio of the vulcanization accelerator is within the above-mentioned range, cyclability of the lithium-ion secondary battery tends to be enhanced.

<<Electrically-Conductive Carbon Material>>

The starting material for the sulfur-based positive-electrode active material may further comprise an electrically-conductive carbon material. This is because by compounding the electrically-conductive carbon material, electric conductivity can be enhanced. Any of various electrically-conductive carbon materials working for enhancing cyclability of the lithium-ion secondary battery can be used as the electrically-conductive carbon material.

Examples of the electrically-conductive carbon material include one or more carbon materials having a fused aromatic ring structure such as carbon black, graphite, carbon nanotube (CNT), carbon fiber (CF), graphene, fullerene and the like. Further, electrically-conductive carbon materials having a nitrogen-containing heterocyclic ring structure can also be used as the electrically-conductive carbon material. Particularly preferred as the electrically-conductive carbon material are carbon materials having a graphite structure, and examples thereof include the above-mentioned carbon materials having a fused aromatic ring structure.

Among them, carbon black is preferable since it is inexpensive and excellent in dispersibility. Also, a small amount of CNT or graphene may be combined with carbon black. In accordance with such combination, cyclability of a lithium-ion secondary battery can be further improved without largely increasing a cost. The combined amount of CNT or graphene is preferably not less than 8% by mass and not more than 12% by mass based on the total amount of electrically-conductive carbon material.

When compounding the electrically conductive carbon material, the compounding ratio thereof is preferably not less than 5 parts by mass, more preferably not less than 10 parts by mass based on 100 parts by mass of the rubber. On the other hand, the compounding ratio of the electrically conductive carbon material is preferably not more than 50 parts by mass, more preferably not more than 30 parts by mass. When the compounding ratio is within the mentioned range, enhancing cyclability by compounding the electrically conductive carbon material tends to be achieved, while sufficiently enhancing a charging and discharging capacity of the lithium ion secondary battery.

In addition, it can be considered that the vulcanization accelerator works for enhancing cyclability of the lithium-ion secondary battery by incorporating much amount of sulfur into the rubber as well as preventing cutting of a polymer when discharging. On the other hand, it can be considered that the electrically-conductive carbon material works for enhancing cyclability of the lithium-ion secondary battery by enhancing electric conductivity in the sulfur-based positive-electrode active material, thereby increasing reactivity with the lithium ion.

<<Preparation of Sulfur-Based Positive-Electrode Active Material>>

Rubbers are used for various purposes, are easily available and inexpensive, are high in reactivity with sulfur, and have a high content of a double bond for incorporating sulfur thereinto. Therefore, it can be considered that by heat-treating the rubber and the sulfur at a temperature higher than a temperature for usual vulcanization, it is possible to prepare a sulfur-based positive-electrode active material in which much amount of sulfur is incorporated in molecules thereof. Further it is presumed that when the sulfur-based positive-electrode active material has the structure of the above formula (i), the structure forms a three-dimensional network, thereby sealing and immobilizing elemental sulfur.

The sulfur-based positive-electrode active material can be prepared by mixing the rubber, the sulfur and, if necessary, the vulcanization accelerator and electrically conductive carbon material at given mixing ratios to give a starting material and heat-treating the starting material at a temperature higher than a temperature for usual vulcanization.

<<Heat Treatment>>

It is preferable that heat treatment is performed by heating under a non-oxidizing atmosphere, thereby enabling an oxidative deterioration or an excess thermal decomposition of the components to be prevented. As a result, the sulfur-based positive-electrode active material being excellent in an effect of enhancing a charging and discharging capacity and cyclability of the lithium-ion secondary battery can be formed. The non-oxidizing atmosphere means an atmosphere substantially containing no oxygen. Example of the heating under a non-oxidizing atmosphere includes heat treatment under an inert gas atmosphere in a silica tube filled with an inert gas such as nitrogen or argon. The temperature of the heat treatment is preferably not less than 250° C., more preferably not less than 300° C. On the other hand, the heat-treating temperature is preferably not more than 550° C., more preferably not more than 450° C. When the heat-treating temperature is within the mentioned range, there is a tendency that decomposition of the starting compound can be prevented while carrying out a sufficient sulfurizing reaction, which is advantageous in achieving a sufficient charging and discharging capacity of the lithium-ion secondary battery.

A period of time for the heat treatment is preferably 2 to 6 hours. When the heat-treating time is within the mentioned range, there is a tendency that the heat treatment can be advanced sufficiently, and that excessive thermal decomposition of the components can be prevented.

The mixing and heat treatment of the starting material can also be carried out by heat-treating while kneading the rubber, sulfur and the like in a continuous apparatus such as a twin-screw extruder.

<<Removal of Un-Reacted Sulfur>>

So-called unreacted sulfur which results from deposition by cooling of sulfur sublimated at the heat treatment may remain in the prepared sulfur-based positive-electrode active material. It is desirable to remove such unreacted sulfur since it causes deterioration of cyclability. Examples of a method for removing unreacted sulfur include a removal by heating under a reduced pressure, a removal by warm wind, a removal by washing with a solvent and the like.

(Pulverization, and Classification)

The sulfur-based positive-electrode active material is pulverized so as to be predetermined grain sizes and is classified to be particles suitable for production of a positive electrode. A preferred particle size distribution of the particles is from about 5 to 25 μm in a median size. It is noted that in the above-explained heat treatment method using a twin-screw extruder, the produced sulfur-based positive-electrode active material can also be pulverized at the same time due to shearing at kneading.

<<Sulfur-Based Positive-Electrode Active Material>>

In the sulfur-based positive-electrode active material prepared through the above-mentioned heat treatment, as the total content of sulfur increases, cyclability of the lithium-ion secondary battery tends to be improved. Therefore, the total content of sulfur as large as possible is preferable. The total content of sulfur by an elemental analysis is preferably not less than 50% by mass, more preferably not less than 51% by mass, further preferably not less than 53% by mass, furthermore preferably not less than 55% by mass. Further, it is preferable that the content of hydrogen is not more than 1.6% by mass, particularly not more than 1.0% by mass.

In a system where a carbon material having a graphite structure is compounded as an electrically conductive carbon material, there is a case where the sulfur content is below the mentioned range due to an influence of carbon constituting the carbon material. However, an effect of enhancing cyclability of the lithium-ion secondary battery can be still exhibited. In such a case, the sulfur content is preferably not less than 45% by mass in order to maintain the effect of enhancing cyclability of the lithium-ion secondary battery.

(Electrically-Conductive Additive)

Examples of an electrically-conductive additive include vapor grown carbon fibers (VGCF), carbon powders, carbon black (CB), acetylene black (AB), KETJENBLACK (KB), graphite, fine powders of metals being stable at positive-electrode potentials, such as aluminum and titanium and the like. One or more thereof can be used as the conductive additive.

(Binder)

The binder is used as a binding agent for fixing the active material and the electrically-conductive additive to the current collector, and in an embodiment of the present invention, a thermosetting resin is used. By using the thermosetting resin as a binder, not only the active material and the electrically-conductive additive are fixed firmly to the current collector but also it is possible to prevent active material from peeling and separating from the current collector due to expansion of the active material and to prevent an electrically-conductive path formed by the electrically-conductive additive from being cut.

The binder is one comprising at least one of a polyimide resin and a polyamide-imide resin. The polyimide resin and the polyamide-imide resin are high in heat resistance and are high in a binding property. Therefore, when these are contained in the binder, the positive electrode having a high heat resistance and a long service life can be produced. The polyimide resin is higher in heat resistance and binding property than the polyamide-imide resin, and therefore, it is preferable that the binder comprises the polyimide resin.

If at least one of a polyimide resin and a polyamide-imide resin is contained in the binder even in a small amount, the above-mentioned effect is exhibited depending on the content thereof. The content of at least one of the polyimide resin and the polyamide-imide resin is preferably not less than 50% by mass, more preferably not less than 70% by mass, further preferably not less than 80% by mass, furthermore preferably not less than 90% by mass based on the whole binder. From the viewpoint of a binding property, it is preferable that the binder is one consisting of at least one of a polyimide resin and a polyamide-imide resin.

(Production of Positive Electrode)

A method of producing the positive electrode comprises a coating step and a curing step.

The coating step is a step of mixing the active material, the electrically-conductive additive and the binder and, if necessary, adding a solvent or the like thereto to give a mixture for the electrode layer in a form of slurry, and applying the mixture on the surface of the current collector. Any of coating methods which are generally used for producing an electrode for a lithium-ion secondary battery can be used suitably as a coating method. Examples of such a coating method include a roll coating method, a dip coating method, a doctor blade coating method, a spray coating method, a curtain coating method, and the like.

Examples of the solvent include one or more of N-methyl-2-pyrrolidone, N,N-dimethylformaldehyde, alcohols, water and the like.

With respect to the compounding ratios of the active material, the electrically-conductive additive and the binder, it is preferable to compound 30 to 95% by mass of the active material, 2 to 40% by mass of the electrically-conductive additive and 3 to 30% by mass of the binder to the total content of these three components. The compounding ratio of the active material is more preferably 50 to 95% by mass, particularly 70 to 95% by mass, the compounding ratio of the electrically-conductive additive is more preferably 2 to 30% by mass, particularly 2 to 15% by mass and the compounding ratio of the binder is more preferably 3 to 20% by mass, particularly 3 to 15% by mass.

The coating thickness of the electrode layer is preferably from 10 μm to 150 μm.

The curing step is a step of heat-treating the mixture for the electrode layer applied on the surface of the current collector at a temperature higher than a curing temperature of the thermosetting resin. The curing of the thermosetting resin binder can be achieved by conducting heat-treatment at a temperature higher than the curing temperature of the thermosetting resin to be used. The representative range of such a temperature is, for example, from 120° C. to 350° C. Further, it is preferable to carry out the heat treatment under a non-oxidizing atmosphere. The non-oxidizing atmosphere is an atmosphere which does not contain oxygen substantially, for example, an atmosphere under a reduced partial pressure of oxygen as low as not causing advancement of oxidation reaction, or inert gas atmospheres such as nitrogen and argon.

Example of another method of producing the positive electrode is a method of kneading the sulfur-based positive-electrode active material with the electrically-conductive additive, the thermosetting resin binder and a small amount of a solvent in a mortar, or the like; molding the kneaded product into a film form; pressure-bonding the film onto the current collector with a press, or the like; and then heat-treating at a temperature higher than the curing temperature of the thermosetting resin.

The thus obtained positive electrode comprises the current collector and the electrode layer formed on a surface thereof, and the electrode layer is one composed of the active material, the electrically-conductive additive and the heat-set thermosetting resin binder. In this positive electrode, the active material is in a form of powder and is fixed on the surface of the current collector via the binder. The particle size of the active material powder is not more than 25 μm in a median size.

<Lithium-Ion Secondary Battery>

In an embodiment of the present invention, the lithium-ion secondary battery is one prepared using the above-mentioned positive electrode and can be produced by a usual method using members to be usually used in this field, namely using a negative electrode, an electrolyte, and further a separator as desired in addition to the use of the positive electrode. The shape of the lithium-ion secondary battery is not limited particularly, and the lithium-ion secondary battery can be in various shapes such as a cylindrical shape, a laminated layer type, a coin shape and a button shape. The lithium-ion secondary battery has a large charging and discharging capacity and is excellent in cyclability.

(Negative Electrode)

Examples of a negative electrode material include known metallic lithium, carbon-based materials such as graphite, silicon-based materials such as a silicon thin film, alloy-based materials such as copper-tin or cobalt-tin and the like. Among the above-mentioned negative electrode materials, in the case where a carbon-based material, a silicon-based material, an alloy-based material or the like that does not include lithium is used, it is advantageous from a point that short-circuiting between positive and negative electrodes, which results from production of dendrite, is less likely to arise.

However, in the case where a negative electrode material that does not include lithium is used in combination with the positive electrode of an embodiment of the present invention, neither the positive electrode nor the negative electrode includes lithium and thus a pre-doping treatment, in which lithium is inserted into either one of the negative electrode or positive electrode, or into both of them, becomes necessary. For a method of lithium pre-doping, a publicly known method can be used. For example, in the case where a negative electrode is doped with lithium, the following methods of inserting lithium can be given: an electrolytically-doping method, in which a half-cell is assembled using metallic lithium as the counter electrode and then doping lithium electrochemically; and an application pre-doping method, in which doping is done by a diffusion of lithium onto an electrode by applying a metallic lithium foil onto the electrode and then leaving the electrode with the metallic lithium foil applied in an electrolytic solution. Moreover, in another case as well where the positive electrode is pre-doped with lithium, it is possible to utilize the aforementioned electrolytically-doping method.

Silicon-based materials, which are high capacity negative electrode materials, are preferred as a negative electrode material that does not include lithium. Among them, a silicon thin film that can make a thickness of the electrode thinner and is advantageous in capacity per volume is particularly preferable.

(Electrolyte)

As for an electrolyte to be used on the lithium-ion secondary battery, it is possible to use those in which an alkali-metal salt serving as an electrolyte is dissolved in an organic solvent. Examples of a preferred organic solvent include at least one selected from nonaqueous solvents, such as ethylene carbonate, propylene carbonate, dimethyl carbonate, diethyl carbonate, ethyl methyl carbonate, dimethyl ether, γ-butyrolactone, and acetonirile. Examples of a usable electrolyte include $LiPF_6$, $LiBF_4$, $LiAsF_6$, $LiCF_3SO_3$, LiI, $LiClO_4$ and the like. A concentration of the electrolyte can be from about 0.5 mol/liter to 1.7 mol/liter. It is noted that the electrolyte is not limited to a liquid form. For example, in the case where the lithium-ion secondary battery is a lithium polymer secondary battery, the electrolyte is a solid form (for example, a form of polymer gel).

(Separator)

In addition to the above-described negative electrode, positive electrode and electrolyte, the lithium-ion secondary battery can be further equipped with the other members, such as separators, as well. A separator intervenes between the positive electrode and the negative electrode, thereby not only allowing the movements of ions between the positive electrode and the negative electrode but also functioning to prevent the positive electrode and the negative electrode from internally short-circuiting one another. When the lithium-ion secondary battery is a hermetically-closed type, a function of retaining the electrolytic solution is required for the separator. As for a separator, it is preferable to use a thin-thickness and microporous or nonwoven-shaped film that is made of a material, such as polyethylene, polypropylene, polyacrylonitrile, aramid, polyimide, cellulose, glass and the like.

Explanation of Terms

Cyclability is a property of a lithium-ion secondary battery where a charging and discharging capacity is decreased in accordance with repeated charging and discharging. A lithium-ion secondary battery, which is small in a degree of decrease in a charging and discharging capacity, is excellent in cyclability, and a lithium-ion secondary battery, which is large in a degree of decrease in a charging and discharging capacity, is poor in cyclability.

DSC stands for a differential scanning calorimetry.

The cis-1,4 bond content of a butadiene rubber is an amount (mass %) of cis-1,4 bond units in the whole butadiene rubber, and can be obtained by 13C-NMR spectrum.

EXAMPLE

<Materials Used for Test>
Rubber: High-cis butadiene rubber (UBEPOL (registered trade mark) BR150L available from Ube Industries, Ltd., cis-1,4 bond content: 98% by mass)
Sulfur: Colloidal sulfur available from Tsurumi Chemical Industry Co., Ltd.
Electrically conductive carbon material: Acetylene black (Denka Black available from Denki Kagaku Kogyo Kabushiki Kaisha) Vulcanization accelerator: NOCCELOR TS (tetramethylthiuram monosulfide available from OUCHI SHINKO CHEMICAL INDUSTRIAL CO., LTD.
Electrically-conductive additive: Acetylene black (Denka Black available from Denki Kagaku Kogyo Kabushiki Kaisha)
Binder 1 (thermosetting resin): Polyimide resin (curing temperature: 200° C. to 250° C. (DSC))
Binder 2 (thermoplastic resin): Polyvinylidene fluoride (available from Wako Pure Chemical Industries, Ltd.)

Example 1

<Preparation of Sulfur-Based Positive-Electrode Active Material>

To 100 parts by mass of a butadiene rubber were compounded 1000 parts by mass of sulfur, 25 parts by mass of a vulcanization accelerator and 20 parts by mass of an electrically conductive carbon material and the compounded mixture was kneaded using a kneading testing device [MIX-LABO manufactured by Moriyama Company, Ltd.] to prepare a kneaded product. The thus obtained kneaded product was cut into small pieces of not more than 3 mm by hand to prepare a starting compound to be subjected to heat treatment.

(Reaction Apparatus)

A reaction apparatus 1 as illustrated in FIG. 1 was used for heat treatment of the starting compound. The reaction apparatus 1 comprises a reaction container 3, which has an outer diameter of 60 mm, an inner diameter of 50 mm and a height of 300 mm and is made of quartz glass, that is formed as a bottomed cylindrical shape to contain and heat-treat the starting compound 2; a silicone plug 4 for closing an upper opening of the reaction container 3; one alumina protection tube 5 ("Alumina SSA-S" available from NIKKATO CORPORATION, an outer diameter of 4 mm, an inner diameter of 2 mm and a length of 250 mm) and two tubes, which are a gas introducing tube 6 and a gas exhausting tube 7 (both are "Alumina SSA-S" available from NIKKATO CORPORATION, an outer diameter of 6 mm, an inner diameter of 4 mm and a length of 150 mm), these three tubes penetrating through the plug 4; and an electric furnace 8 (crucible furnace, width of an opening: 80 mm dia., heating height: 100 mm) for heating the reaction container 3 from the bottom side.

The alumina protection tube 5 is formed in such a length that the lower part thereof reaches the starting compound 2 contained in the bottom of the reaction container 3 from the plug 4 and a thermocouple 9 is inserted through the inside of the alumina protection tube 5. The alumina protection tube 5 is used as a protective tube for the thermocouple 9. The leading end of the thermocouple 9 is inserted into the starting compound 2 while being protected by the closed leading end of the alumina protection tube 5 and functions to measure a temperature of the starting compound 2. The output of the thermocouple 9 is input in a temperature controller 10 of the electric furnace 8 as shown by the solid arrow in the drawing and the temperature controller 10 functions to control a heating temperature of the electric furnace 8 based on the input from the thermocouple 9.

The gas introducing tube 6 and the gas exhausting tube 7 are formed such that the bottom end thereof projects in 3 mm downwardly from the plug 4. Also, the upper part of the reaction container 3 projects from the electric furnace 8 to be exposed to atmosphere. Therefore, steam of sulfur generating from the starting compound due to heating of the reaction container 3 is raised to the upper part of the reaction container 3 as shown by the long dashed short dashed line arrow in the drawing, and transformed to a liquid drop while being cooled to be dropped and refluxed as shown by the broken line arrow in the drawing. Consequently, sulfur in the reaction system does not leak to the outside through the gas exhausting tube 7.

The gas introducing tube 6 is continuously supplied with Ar gas from a gas supply system which is not shown. The gas exhausting tube 7 is connected to a trapping bath 12 containing an aqueous solution 11 of sodium hydroxide. The exhaust gas moving toward the outside through the gas exhausting tube 7 from the reaction container 3 is released to the outside after passing through the aqueous solution 11 of sodium hydroxide in the trapping bath 12. Therefore, even if hydrogen sulfide gas generated from a vulcanization reaction is included in the exhaust gas, the hydrogen sulfide gas is removed therefrom by being neutralized with the aqueous solution of sodium hydroxide.

[Heat Treatment Step]

Heating with the electric furnace 8 was started 30 minutes after starting a continuous supply of Ar (argon) gas to the reaction container 3 holding the starting compound 2 in its bottom at a flow rate of 80 ml/min from the gas supply system. The temperature elevation rate was 5° C./min. Since generation of gas was started when the temperature of the starting compound became 200° C., the heating was continued while adjusting the flow rate of the Ar gas such that the flow rate of the exhaust gas became as constant as possible. When the temperature of the starting compound 2 reached 450° C., heat treatment was conducted for two hours while maintaining the temperature of 450° C. Then, a reaction product was cooled naturally under an Ar gas atmosphere to 25° C. while adjusting the flow rate of the Ar gas and the reaction product was taken out of the reaction container 3.

[Removal of Unreacted Sulfur]

In order to remove the unreacted sulfur (free elemental sulfur) remaining in the product after the heat treatment step, the following step was carried out. Namely, the reaction product was pulverized in a mortar and 2 g of a pulverized product was put in a glass tube oven and heated for three hours at 250° C. while vacuum suction was conducted to produce a sulfur-based positive-electrode active material 1 in which unreacted sulfur was removed (or only a trace amount of unreacted sulfur was contained). The temperature elevation rate was 10° C./min.

<Positive Electrode>

The sulfur-based positive-electrode active material 1 as produced above, an electrically conductive additive (acetylene black) and a binder (a polyimide resin) were measured so that the compounding ratio thereof became the sulfur-based positive-electrode active material 1:the electrically conductive additive:the binder=87:3:10 (% by mass), and were put into a container. While adjusting a viscosity of the mixture using N-methyl-2-pyrrolidone (available from Kishida Chemical Co., Ltd., battery grade) as a dispersant, the mixture was subjected to stirring and mixing with a rotation/revolution mixer (ARE-250 available from Thinky Corporation) to prepare a uniform slurry. The prepared slurry was applied onto a 20 μm thick aluminum foil (current collector) with an applicator (in a thickness of 60 μm), followed by 3-hour heating at 250° C. with a dryer for thermosetting the binder. Thus, a positive electrode of Example 1 was obtained.

<Negative Electrode>

A metallic lithium foil [manufactured by Honjo Metal Co., Ltd.] having a thickness of 500 μm was punched out to a circle with 14 mm in diameter to prepare a negative electrode.

<Electrolyte>

A nonaqueous electrolyte in which $LiPF_6$ had been dissolved in a mixed solvent of ethylene carbonate and diethyl carbonate was used as an electrolyte. A volume ratio of ethylene carbonate and diethyl carbonate was 1:1. A concentration of $LiPF_6$ was 1.0 mol/liter.

<Lithium-Ion Secondary Battery>

The above positive electrode and negative electrode were laminated via a separator [Celgard (registered trademark) 2400 manufactured by Celgard] consisted of a polypropylene microporous film with 25 μm in thickness and a glass nonwoven filter with 500 μm in thickness in a battery case (e.g., a member for CR2032-type coin battery, a product of HOSEN Co., Ltd.) made of a stainless-steel container and the electrolyte solution was added thereto, followed by sealing hermetically with a crimping machine, thereby obtaining a CR2032 coin-type lithium-ion secondary battery. All the operations were performed in a dry room.

Example 2

A positive electrode of Example 2 and a lithium-ion secondary battery using the positive electrode were prepared in the same manner as in Example 1 except that an electrically conductive carbon material and a vulcanization accelerator were not used.

Comparative Example 1

A positive electrode of Comparative Example 1 and a lithium-ion secondary battery using the positive electrode were prepared in the same manner as in Example 1 except that polyvinylidene fluoride was used as a binder. It should be noted that since polyvinylidene fluoride is a thermoplastic resin, in the heating at a final stage of preparation of the positive electrode, "3-hour heating at 250° C." was changed to "10-hour heating at 150° C.".

Comparative Example 2

A positive electrode of Comparative Example 2 and a lithium-ion secondary battery using the positive electrode were prepared in the same manner as in Example 1 except that in the step of heat-treating the starting material for a sulfur-based positive electrode active material, an ultimate temperature thereof was changed to 600° C.

Comparative Example 3

A positive electrode of Comparative Example 3 and a lithium-ion secondary battery using the positive electrode were prepared in the same manner as in Example 1 except that in the step of heat-treating the starting material for a sulfur-based positive electrode active material, an ultimate temperature thereof was changed to 200° C.

<Measurement of Charging and Discharging Capacity and Capacity Retention Rate>

Figure 2:
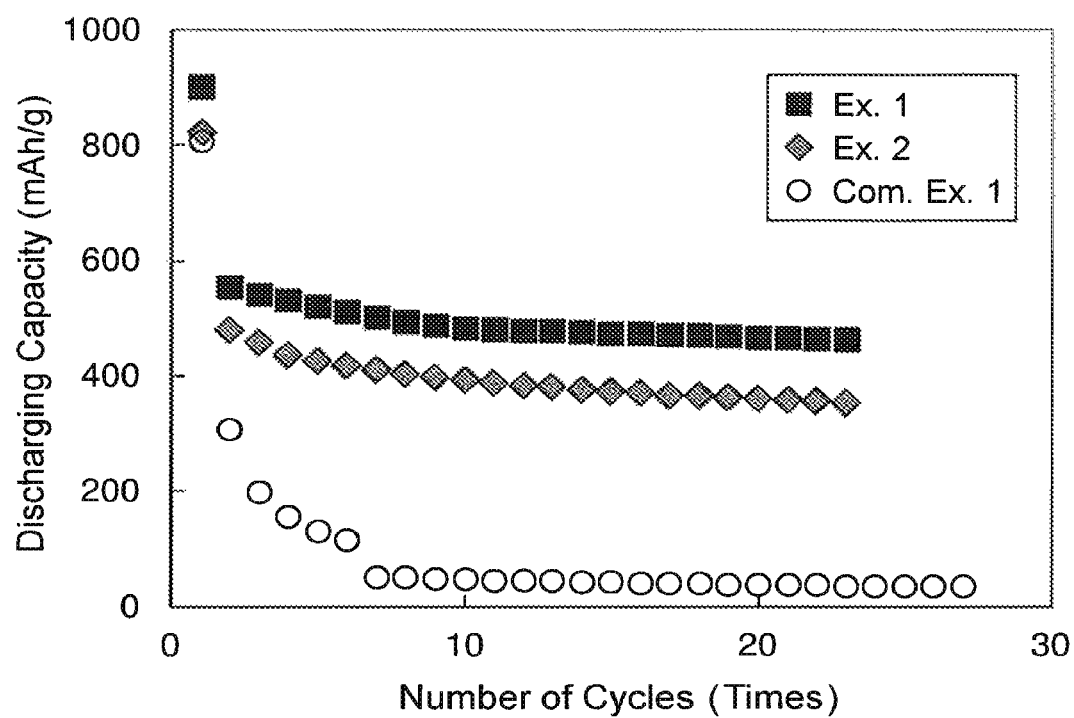
FIG. 2 is a graph showing a result of cyclic charging and discharging in Examples 1 and 2, and Comparative Example 1.

With respect to each lithium-ion secondary battery prepared in Examples 1 and 2 and Comparative Example 1, charging and discharging capacities thereof were measured. Specifically, charging and discharging were carried out repeatedly at an electric-current value equivalent to 250 mA (corresponding to 0.5 C) per 1 g of the positive-electrode active material under a condition of a test temperature of 30° C. The discharge termination voltage was 1.0 V and the charging termination voltage was 3.0 V. Each discharging capacity (mAh/g) was measured. The results are shown in FIG. 2.

A discharging capacity (mAh/g) at the second discharging was regarded as an initial capacity. The larger the initial capacity is, the larger the charging and discharging capacity of the lithium-ion secondary battery is, which is evaluated as preferable. Moreover, from a discharging capacity $DC_{10}$ (mAh/g) at the tenth discharging and a discharging capacity $DC_{20}$ (mAh/g) at the twentieth discharging, a capacity retention rate (%) was calculated by the formula (a).

$$\text{Capacity retention rate (\%)} = (DC_{20} \text{ (mAh/g)}/DC_{10} \text{ (mAh/g)}) \times 100 \quad\quad (a)$$

It can be said that the higher the capacity retention rate is, the more excellent cyclability of the lithium-ion secondary battery is. A capacity retention rate of not less than 90% is regarded as satisfactory. Further, the capacity retention rate is preferably not less than 95%.

<Elemental Analysis>

An elemental analysis of sulfur-based positive-electrode active materials produced in Examples and Comparative Examples was carried out. As for carbon, hydrogen, nitrogen and sulfur, a mass ratio (%) based on the total amount of a sulfur-based positive-electrode active material was calculated from a mass amount measured with a full automatic elemental analysis device vario MICRO cube available from Elementar Japan K.K.

The results are shown in Table 1.

TABLE 1

|  | Example | | Comparative Example | | |
|---|---|---|---|---|---|
|  | 1 | 2 | 1 | 2 | 3 |
| Positive-electrode active material Formulation (part by mass) | | | | | |
| Rubber | 100 | 100 | 100 | 100 | 100 |
| Sulfur | 1000 | 1000 | 1000 | 1000 | 1000 |
| Electrically conductive carbon material | 20 | — | 20 | 20 | 20 |
| Vulcanization accelerator | 25 | — | 25 | 25 | 25 |
| Temperature of heat-treating step (° C.) | 450 | 450 | 450 | 200 | 600 |
| Positive electrode Formulation (% by mass) | | | | | |
| Positive-electrode active material | 87 | 87 | 87 | 87 | 87 |
| Electrically conductive additive | 3 | 3 | 3 | 3 | 3 |
| Binder 1 (thermosetting) | 10 | 10 | — | 10 | 10 |
| Binder 2 (thermoplastic) | — | — | 10 | — | — |
| Heating (curing) temperature (° C.) | 250 | 250 | 150 | 250 | 250 |
| Evaluation of lithium-ion secondary battery Discharging capacity (mAh/g) | | | | | |
| 1st time | 901 | 871 | 807 | 127 | 340 |
| 2nd time | 553 | 523 | 306 | 71 | 191 |
| 10th time | 484 | 421 | 47 | 66 | 172 |
| 20th time | 466 | 388 | 37 | 63 | 155 |
| Capacity retention rate (%) | 96.3 | 92.2 | 78.9 | 95.5 | 90.1 |
| Elemental analysis (%) | | | | | |
| C | 44.8 | 45.9 | 44.8 | 57.6 | 64.7 |
| H | 0.2 | 0.3 | 0.2 | 2.1 | 0.1 |
| N | 0.1 | 0.0 | 0.1 | 0.1 | 0.1 |
| S | 55.8 | 53.7 | 55.8 | 40.5 | 32.9 |

As it can be seen from Table 1, in the lithium-ion secondary battery of Example 1 using, as a binder, the polyimide resin being a thermosetting resin, the discharging capacity at the 20th time (number of cycles: 20) is maintained at 466 mAh/g. Meanwhile, in the lithium-ion secondary battery of Comparative Example 1 using, as a binder, the polyvinylidene fluoride being a thermoplastic resin, the discharging capacity deteriorated from the initial stage and was hardly left at the 20th time (number of cycles: 20).

Thus the lithium-ion secondary battery of Example 1 has greatly improved cyclability as compared with the lithium-ion secondary battery of Comparative Example 1. Further, the both of the discharging capacity and cyclability of Example 1 are more satisfactory than those of Example 2. It can be considered that this is because more sulfur was incorporated into the active material due to the addition of the vulcanization accelerator when preparing the positive-electrode active material and also because electric conductivity of the active material was improved due to the addition of the electrically conductive carbon material.

The mass ratio of sulfur of Example 1 was 55.8%, and the mass ratio of sulfur of Example 2 was 53.7%. In Comparative Example 2, the discharging capacity was scarcely exhibited at the 20th time (number of cycles: 20), and the discharging capacity of Comparative Example 3 at the 20th time (number of cycles: 20) was 155 mAh/g. Thus, the discharging capacities of Comparative Examples 2 and 3 deteriorated to a large extent as compared with Example 1. It can be considered that this is because in Comparative Example 2, the reaction of the rubber with the sulfur did not proceed sufficiently, and an amount of incorporated sulfur was small, and in Comparative Example 3, the positive-electrode active material was decomposed.

EXPLANATION OF SYMBOLS

1 Reaction apparatus
2 Starting compound
3 Reaction container
4 Plug
5 Alumina protection tube
6 Gas introducing tube
7 Gas exhausting tube
8 Electric furnace
9 Thermocouple
10 Temperature controller
11 Aqueous solution of sodium hydroxide
12 Trapping bath

What is claimed is:

1. A method of making a positive electrode for a lithium-ion secondary battery having a current collector and an electrode layer comprising:
    forming on a surface of the current collector an electrode layer comprising an active material, an electrically-conductive additive and a thermosetting resin binder subjected to thermosetting, wherein the active material comprises a sulfur-based positive-electrode active material prepared by heat-treating at a temperature from 250° C. to 550° C. a starting material comprising a rubber and sulfur under a non-oxidizing atmosphere, wherein the rubber is high cis polybutadiene rubber having not less than 95% by mass of cis-1,4 bond content.

2. The method of making a positive electrode for a lithium-ion secondary battery of claim 1, wherein the thermosetting resin binder comprises at least one of a polyimide resin and a polyamide-imide resin.

3. The method of making positive electrode for a lithium-ion secondary battery of claim 1, wherein compounding ratios of the active material, the electrically-conductive additive and the thermosetting resin binder in the electrode layer are 30 to 95% by mass, 2 to 40% by mass and 3 to 30% by mass, respectively based on the total compounding amount of the three components.

4. The method of making a positive electrode for a lithium-ion secondary battery of claim 1, wherein the starting material of the sulfur-based positive-electrode active material further comprises a vulcanization accelerator.

5. The method of making a positive electrode for a lithium-ion secondary battery of claim 1, wherein the starting material of the sulfur-based positive-electrode active material further comprises an electrically-conductive carbon material.

6. The method of making a positive electrode for a lithium-ion secondary battery of claim 5, wherein the electrically-conductive carbon material is a carbon material having a graphite structure.

7. The method of making a positive electrode for a lithium-ion secondary battery of claim 6, wherein the starting material of the sulfur-based positive-electrode active material comprises 250 to 1500 parts by mass of the sulfur, 3 to 250 parts by mass of the vulcanization accelerator and 5 to 50 parts by mass of the electrically-conductive carbon material based on 100 parts by mass of the rubber.

8. The method of making a positive electrode for a lithium-ion secondary battery of claim 1, wherein a total content of the sulfur in the sulfur-based positive-electrode active material is not less than 50% by mass.

9. A method of making a lithium-ion secondary battery comprising:

a step of making the positive electrode for a lithium-ion secondary battery according to claim 1, and a step of making a lithium-ion secondary battery having the positive electrode for a lithium-ion secondary battery obtained in the former step.

* * * * *